D. ANDERSON, Jr.
PROCESS OF TREATING ARSENICAL MATERIAL.
APPLICATION FILED FEB. 7, 1914. RENEWED JUNE 6, 1916.

1,198,095. Patented Sept. 12, 1916.

a ———————————— SULFATING ———————————— b ———————————— HEATING ———————————— c ———————————— PULVERIZING ———————————— d ———————————— DRIVING OFF ARSENIC ———————————— e ———————————— ROASTING ———————————— f ———————————— LEACHING WITH WATER ————————————

| RESIDUE:- | SOLUTION:- |
|---|---|
| INSOLUBLE SULFATES, & | ZINC, |
| ALUMINA, | COPPER, |
| IRON OXIDE, | CADMIUM, |
| ARSENIC, | SILVER etc. |
| ANTIMONY, | IRON, |
| BISMUTH etc., | ALUMINA, } very small |
| COPPER, } very small | ARSENIC, } quantities |
| CADMIUM, } quantities | ANTIMONY etc. |
| ZINC etc. | |

WITNESSES:

G. M. Ball
F. C. Fliedner

INVENTOR
Duncan Anderson Jr.
BY Francis M. Wright
ATTORNEY

UNITED STATES PATENT OFFICE.

DUNCAN ANDERSON, JR., OF SAN FRANCISCO, CALIFORNIA.

PROCESS OF TREATING ARSENICAL MATERIAL.

1,198,095.

Specification of Letters Patent. Patented Sept. 12, 1916.

Application filed February 7, 1914, Serial No. 817,186. Renewed June 6, 1916. Serial No. 103,026.

*To all whom it may concern:*

Be it known that I, DUNCAN ANDERSON, Jr., a subject of the King of Sweden, residing at San Francisco, in the county of San Francisco and State of California, have invented new and useful Improvements in Processes of Treating Arsenical Material, of which the following is a specification.

The object of the present invention is to provide a process for recovering the valuable constituents of arsenical flue dust, or of other material of high arsenic content, that is already in, or that can, by roasting or otherwise, be brought into, a condition in which sulfuric acid can combine with the constituent metals.

In the drawing, the figure is a diagrammatic representation of my improved process.

In practising this process the arsenical material is first sulfated without alkaline bisulfate fusion by being thoroughly mixed with sulfuric acid slightly in excess of that necessary to combine with constituent substances with which sulfuric acid can combine. This step of the process may be cheapened by subjecting the material to the action of sulfurous gases with subsequent oxidation, thus diminishing the amount of sulfuric acid required. The mass is then subjected to a gentle heat, with stirring, for such a length of time that, when cold, the mass may be pulverized. The mass is then pulverized by rolls or other suitable means, and transferred to a flue or hearth, maintained at an even heat, above the boiling point of sulfuric acid and below the point of decomposition of the metallic sulfates, and in a current of air or gas. If air is used, arsenic is volatilized in combination with sulfuric acid, and can be precipitated by water spray, or by electric precipitation in a condensing chamber beyond. This separation depends on the fact that the sulfuric acid compounds of arsenic are volatile at this low temperature, and, owing to the remainder of the mass being neutral or acid, the volatilized arsenic oxid cannot recombine with the mass. If a current of combustible gas is used, the arsenic may be largely reduced to elemental arsenic, which condenses in brilliant scaly crystals in the condenser. A small amount of arsenic will remain after this operation, usually from 3 or 6 tenths of 1%. The mass is then treated to recover the valuable metals. It is first roasted until the sulfate of iron, which is generally present, is partly decomposed, and the material becomes of a light pink color. The mass is then leached with hot water, by which such sulfates as those of Zn, Cd, Cu, Fe, Ag, Bi, are dissolved out together with small amounts of arsenic and antimony. The residue is filter-pressed and washed. It contains any lead sulfate that may have been formed, most of the antimony and bismuth, and considerable of the arsenic remaining after the first treatment, and is suitable for treatment for lead by well known metallurgical methods. The solution is treated with zinc dust, whereby Cd, Cu, etc., with probably small amounts of As, Sb, are precipitated. The metals are separated from solution by any suitable means, and the solution is treated with an oxidizing agent, such as a peroxid or persulfate, to oxidize the iron, arsenic, etc., and is treated with lime, zinc oxid, or other basic material, to precipitate the iron and the remaining arsenic and antimony. The zinc sulfate can be crystallized out and roasted for zinc distillations, or otherwise utilized.

I claim:—

1. In the recovery of metals from arsenical material such as flue dust and arsenical ores, the process which consists in the addition of sulfuric acid, in amount not greatly exceeding that required for combination with the substances present, calculating for bases that required to form normal salts, and heating to drive off arsenic from solids resulting therefrom.

2. In the recovery of metals from arsenical materials containing iron and zinc such as flue dust and arsenical ores, the process which consists in the addition of sulfuric acid, in amount not greatly exceeding that required for combination with the substance present, calculating for bases, that required to form normal salts, heating to drive off arsenic from solids resulting therefrom, roasting at such temperature that no more than a small amount of zinc is rendered insoluble, and finally dissolving out soluble materials with water.

3. In the recovery of metals from arsenical material such as flue dust and arsenical ores, the process which consists in adding sulfuric acid by contact with sulfurous gases previously passed over contact material, in amount not greatly exceeding that required for combination with the substances present, calculating for bases that required to form normal salts, and heating to drive off arsenic from solids resulting therefrom.

4. In the treatment of arsenic carrying sulfates, containing iron and zinc, to recover metals, the process which consists in roasting to decompose iron sulfates to oxidize iron to render arsenic insoluble, and then dissolving out the soluble constituents with water.

In testimony whereof I have hereunto set my hand in the presence of two subscribing witnesses.

DUNCAN ANDERSON, Jr.

Witnesses:
FRANCIS M. WRIGHT,
D. B. RICHARDS.